United States Patent [19]

Crouch et al.

[11] Patent Number: 5,895,705
[45] Date of Patent: Apr. 20, 1999

[54] AWNING AND BACKLIT SIGN FABRIC HAVING A SELECTIVELY ERADICABLE INK LAYER AND A PROCESS FOR PRODUCING SAME

[75] Inventors: Earl T. Crouch, High Point; Keith N. Gray, Greensboro, both of N.C.

[73] Assignee: Highland Industries, Inc., Greensboro, N.C.

[21] Appl. No.: 08/891,555

[22] Filed: Jul. 11, 1997

[51] Int. Cl.⁶ .................................................. B32B 9/00
[52] U.S. Cl. ................... 156/247; 428/195; 428/200; 428/202; 428/204; 428/207; 428/211; 428/349; 428/352; 428/354; 428/913; 428/914; 362/152; 264/132; 264/259; 156/230; 156/239; 156/240; 156/249; 156/244.16; 156/277
[58] Field of Search ............................. 428/914, 913, 428/200, 207, 211, 349, 352, 354, 202, 204, 195; 362/152, 812; 156/240, 239, 249, 247, 309.6, 230, 244.16, 277; 264/132, 254

[56] References Cited

U.S. PATENT DOCUMENTS

| | | | |
|---|---|---|---|
| 2,571,962 | 10/1951 | Smith et al. | 154/97.5 |
| 3,790,431 | 2/1974 | Tung | 161/3.5 |
| 3,941,778 | 3/1976 | Mueller et al. | 260/240 B |
| 4,005,538 | 2/1977 | Tung | 40/132 R |
| 4,104,468 | 8/1978 | Valenti | 542/447 |
| 4,245,282 | 1/1981 | Sokol | 362/84 |
| 4,462,852 | 7/1984 | Custor | 156/231 |
| 4,513,107 | 4/1985 | Fabbrini et al. | 524/344 |
| 4,542,078 | 9/1985 | Fitzer et al. | 428/914 |
| 4,555,436 | 11/1985 | Geurtsen et al. | 428/200 |
| 4,565,842 | 1/1986 | Fitzer et al. | 524/57 |
| 4,692,847 | 9/1987 | Gandy | 362/152 |
| 4,737,224 | 4/1988 | Fitzer et al. | 156/240 |
| 4,900,614 | 2/1990 | Miyazato et al. | 428/251 |
| 4,946,739 | 8/1990 | Chapman et al. | 428/286 |
| 5,021,931 | 6/1991 | Matsui et al. | 362/84 |
| 5,152,861 | 10/1992 | Hann | 156/230 |
| 5,281,290 | 1/1994 | Bosler | 156/230 |
| 5,490,893 | 2/1996 | Enlow et al. | 156/230 |

*Primary Examiner*—Bruce H. Hess
*Assistant Examiner*—Abraham Bahta
*Attorney, Agent, or Firm*—Rhodes, Coats & Bennett, LLP

[57] ABSTRACT

Backlit sign fabric formed by coating release paper with ink, applying a plastisol coating onto the dried ink, applying a reinforcing scrim onto the coating, curing the product, then removing the release paper.

7 Claims, 3 Drawing Sheets

AWNING AND BACKLIT SIGN FABRIC HAVING A SELECTIVELY ERADICABLE INK LAYER AND A PROCESS FOR PRODUCING SAME

FIELD OF THE INVENTION

The present invention is directed to an improved awning and backlit sign fabric having a selectively eradicable ink layer and a process for producing same. More particularly, the present invention is directed to an awning and backlit sign fabric that includes a superior eradicable ink layer having improved resolution.

BACKGROUND OF THE INVENTION

Vinyl coated and laminated backlit signs and awnings are in wide use throughout the world. Fabrics that are used as the strength member in such applications should have exceptional geometry, the ability to withstand the rigors of further processing without distortion, and yet stable enough for use in subsequent high speed manufacturing processing.

Typically, backlit signs and awnings are constructed of a translucent sheet or panel that is stretched about a metal framework, and have a light source placed on the side opposite the side being viewed. By selectively printing opaque regions on the fabric panel, words or graphics may be formed by the translucent portions of the fabric panel. The overall effect is a lighted sign that is relatively durable, and which may be viewed during the day and at night.

The material that is commonly used to form awnings is a PVC (polyvinylchloride) film or a related PVC-based material; e.g., PVC films laminated onto knitted polyester scrims (reinforcement fabric). PVC has limited durability, tear resistance, and integrity, particularly after prolonged exposure to the outside elements and UV radiation. Consequently, it has been necessary to provide a fabric substrate or scrim for the plastisols or films to give the awning fabric sufficient strength, durability, and integrity.

Attempts have been made to utilize a scrim or woven mesh panel for constructing backlit signs and awnings. However, the presence of a scrim has been found to significantly compromise the aesthetics of the backlit awning sign. In this regard, the scrim of conventional awning fabrics tends to absorb substantially all of the incident light, making the outline of the scrim pattern highly visible to the viewer. In an attempt to mask the mesh outline, manufacturers reduced the overall area of the awning fabric covered by the scrim in order to obtain more uniform transmission of light through the fabric. This was accomplished by using low denier yarns to form the scrim and/or enlarging the interstices defined within the scrim. The result was a proportionate reduction in the durability and strength of the fabric.

To overcome these disadvantages, the inventor of the present invention previously developed a backlit and awning fabric comprising a woven scrim that was treated with an optical brightener (see U.S. Application Ser. No 08/594, 984). A translucent coating or PVC plastisol was cast onto release paper and then fused together by heat in a commercial oven. A second PVC plastisol coating was cast on top of the fused PVC-release paper on which the woven scrim was laminated. These combined layers were smoothed with finishing rollers to produce a white fabric. Lastly, ink was printed on to the fabric.

While this backlit and awning fabric is superior over existing fabrics with similar applications, there remains a need to develop new and more efficient processes for applying the ink layer onto fabric to improve the visual standards for quality backlit signs. The application of the PVC plastisol to the fabric prior to the inking operation is inefficient and results in excess waste of vinyl coated fabric when the ink application is defective or in error. Further, when wet ink is applied to the PVC layer, the ink tends to diffuse into the PVC leaving a somewhat fuzzy pattern edge when the ink is later eradicated to produce the selected pattern. Thus, there is a need to produce an awning fabric which produces a higher resolution image following eradication.

SUMMARY OF THE INVENTION

The present invention is directed to a process for attaching a backlit sign and awning fabric on top of a pre-dried ink layer rather than first constructing a white fabric and then applying a wet ink layer on top as is conventionally done in the sign and awning field. In the preferred embodiment, a preselected vinyl acrylic ink or coating that is translucent under backlit conditions is first applied to a carrier substrate such as a release paper. The ink is then dried using warm air. Next, a PVC plastisol is cast onto the inked/coated release paper, and finally a fabric scrim is applied. The laminate is cured in six different heating zones using one continuous oven. The cured product is then calendared and cooled. A stripping apparatus then removes the release paper from the product, which is now ready for use as backlit sign and awning fabric.

The process of the present invention has several advantages. First, improved production yields in the resulting backlit sign and awnings have occurred through a 100% increase in through put. Since the present invention involves printing the ink onto a calendared release paper, a good smooth coating is achieved. Previously, the ink was applied onto a vinyl coated fabric. Backlit products require very precise tolerances for thickness of ink layers to achieve uniform backlit appearances. By eliminating the second coating and curing step, a 100% increase in through put with the same equipment is achieved. Secondly, working loss resulting from defects and/or errors in applying the ink to the release paper (approximately 35%) can be significantly reduced, because the inked release paper can be recycled and re-used. Thirdly, because the ink is dry when the PVC is cast onto the ink layer, the ink does not diffuse into the PVC. Then when the ink is selectively removed by the sign manufacturer, the interface at the edge of the pattern is sharper and clearer. Surprisingly the resolution is substantially better.

In a preferred embodiment, the method further includes the step of calendaring and cooling the combined layers after the curing step. The sign manufacturer selectively applies a solvent to the ink, thereby forming a prescribed pattern on the backlit sign and awning fabric. The resulting pattern has sharply defined edges as a result of the current process.

The present invention will be further appreciated by those of ordinary skill in the art from a reading of the figures and the detailed description of the preferred embodiments which follow, such description being merely illustrative of the present invention.

DETAILED DESCRIPTION OF THE PREFERRED EMBODIMENTS

Figure 1:
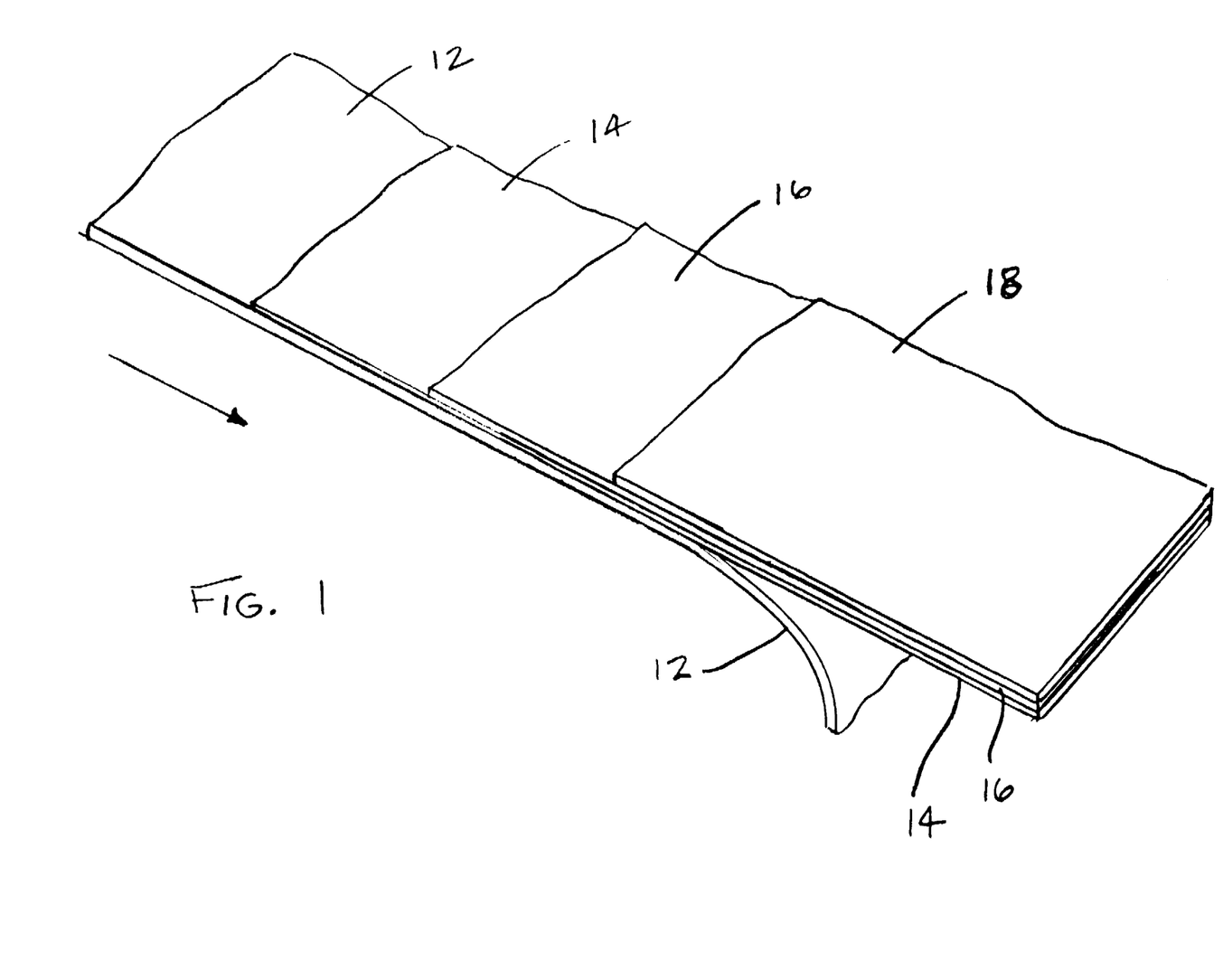
FIG. 1 is a side cross-sectional view of the backlit sign and awning fabric of the present invention.

Referring to FIG. 1, a backlit sign and awning fabric is generally denoted by numeral 10. Fabric 10 is a laminate formed of a carrier substrate 12 (i.e., release paper which is removed in the final operation), an eradicable ink layer 14, a PVC plastisol containing layer 16, and fabric scrim 18.

Carrier substrate 12 is generally a release paper that is a specially treated paper substrate having a release coating thereon (e.g., cobalt complex, silicone, and others). The texture of carrier substrate surface 12 is chosen to provide the desired surface aesthetics for the finished product, for example, from matte to very high gloss. Suitable release papers include Ultracast Patent (95% reflectance), Transcote GEHR (35% reflectance), and Transcote EHR (15% reflectance), all available from S. D. Warren Company. Use of the different types of release papers allows flexibility of the product from the standpoint of gloss without changing the chemical make-up of the ink in this respect. While gloss variations are possible by incorporating various additions such as fumed silica to the ink, these additions generally deleteriously affect the weatherability of the ink.

The inks 14 are preferably translucent vinyl acrylic inks. Such inks typically include three components: pigment, clear varnish (i.e., acrylic resins) and a solvent. These inks are commercially available in several basic colors. Custom colors are created by mixing appropriate commercial inks together (e.g., turquoise by mixing green, blue and white). According to the present invention, it is desirable to form custom colors (such as turquoise) by dispersing all necessary pigments (e.g., green, blue and white) into clear varnish prior to putting the inks into solution. Thus, instead of forming separate inks and then combining them, it has been found desirable to disperse the pigments in the varnish first and then add the solvent. The preferred ink has a viscosity of 3600 cps. and an optical density of 65-70% light transmission.

The PVC, plastisol containing layer 16 is preferably a vinyl plastisol. Suitable vinyl plastisols are available from Rutland Plastic Technologies. The vinyl plastisol typically comprises a PVC resin, plasticizers, and additives such as thermal stabilizers, flame retardants, biocides, pigments, and inorganic fillers. In addition, the plastisol contains optical brighteners, which comprise about 0.5 to about 10% by weight of the vinyl plastisol composition. Urethane or acrylic may be used in place of plastisol.

Scrim 18 is preferably produced on a conventional warp knit, weft inserted knitting machine, although other types of scrim may be used. In the preferred scrim, the warp yarns are made of polyester having a denier of between about 150 and about 2000. Weft yarns are also constructed of polyester yarns having a denier between about 150 and about 1500. The stitching yarns are made of polyester having a denier between about 20 and about 200.

Scrim 18 may be treated with an optical brightener. The optical brightener utilized is preferably a fluorescent whitening agent. Suitable optical brighteners include LEUCOPHOR EHB™ and LEUCOPHOR EHR™, each available from Sandoz Chemicals Corporation of Charlotte, N.C. The optical brightener is added by saturation in an aqueous solution including from about 0.5% to about 20.0% by weight of the optical brightener and a small amount of acrylic or vinyl emulsion as a bonding agent for the optical brightener. Saturation may be accomplished by dip coating or transfer roll coating.

Treatment of scrim 18 with an optical brightener provides the scrim with greater luminescence. As a result, when the fabric 10 is viewed, less contrast is detected between the scrim yarns and interstices.

Figure 2:
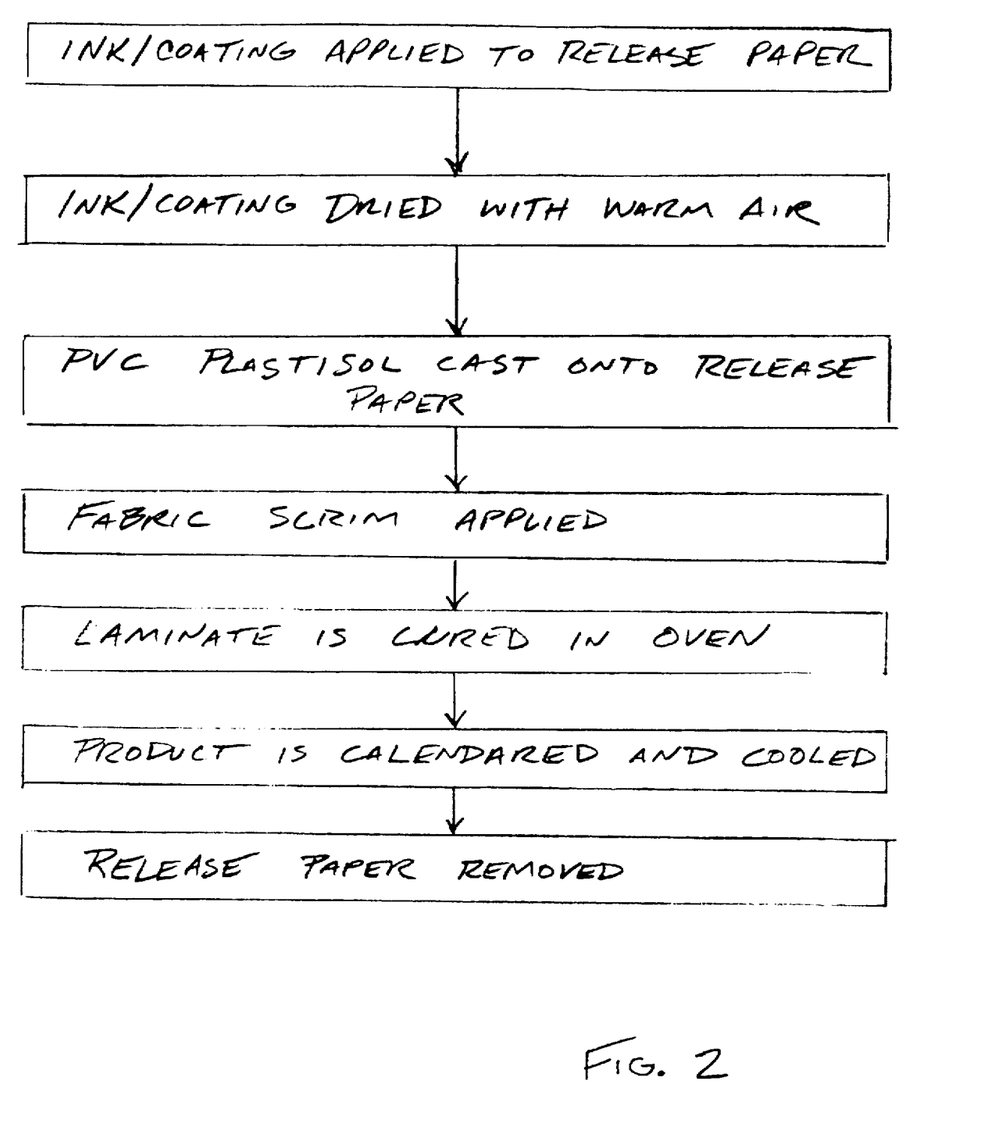
FIG. 2 is a flowchart of the preferred processing steps of the present invention.
Figure 3:
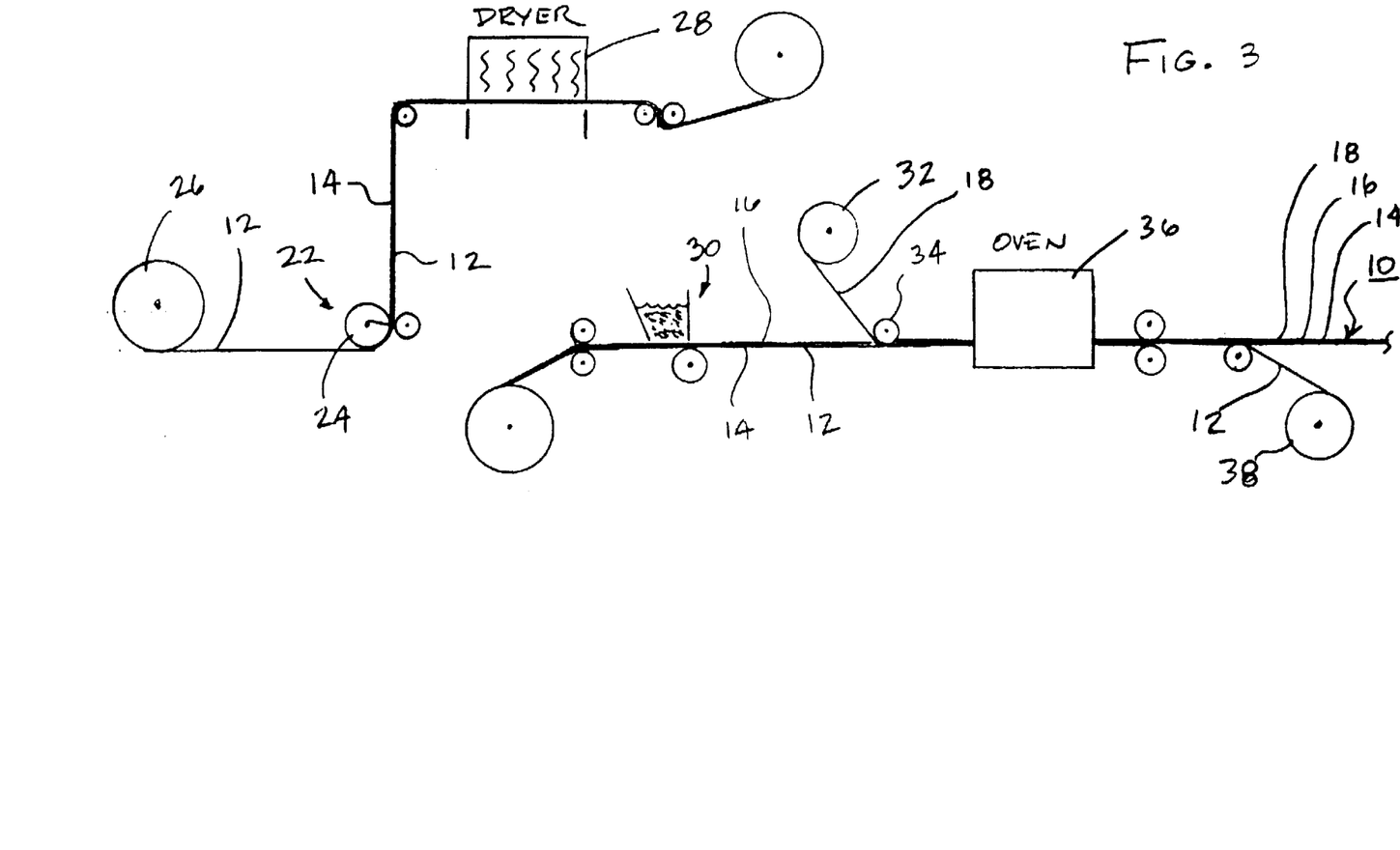
FIG. 3 is a schematic view of an apparatus for carrying out a first pass for producing the backlit sign and awning fabric of the present invention.

Referring to FIGS. 2 and 3, fabric 10 is produced in the following manner. At an ink application station 22, a vinyl acrylic ink 14 is delivered from a tank under a constant pressure (about 4 to 30 lbs/sq. inch) to a manifold. The single ink stream is broken up into two streams, with each stream being delivered to both ends of a Stork PD IV rotary screen printer 24 sold by Stork X-cel BV of Holland. A supply roller 26 delivers release paper 12 to the rotary screen printer, where the ink 14 is uniformly deposited across at least one surface of release paper 12. The inked release paper is dried by passing through a dryer where a constant flow of warm air is caused to flow over the inked release paper for a sufficient period of time.

The dried ink coated release paper is delivered to a coating station 30, where PVC, in viscous plastisol form is uniformly coated across the surface of the inked release paper. The scrim 18 is drawn from roller 32 and is laid onto the PVC plastisol layer by means of a tension roller 34. Next, the combined layers are conveyed through one continuous oven 36 having six different heating zones, with each portion of the layers being exposed to temperatures between about 200-400° F. Preferably the oven temperatures in the six zones are:

| | |
|---|---|
| 225° F. - Zone 1 | 325° F. - Zone 4 |
| 250° F. - Zone 2 | 375° F. - Zone 5 |
| 275° F. - Zone 3 | 375° F. - Zone 6 |

Each zone is bout 12 feet in length and speeds range from 10-20 yards per minute. During this time period, the PVC layer 16 is cured. The cured product is calendared and cooled. A stripper 36 then removes the release paper 12 from the remaining product which is now ready to be processed into a backlit sign or awning. To form a pattern of words or figures on the fabric, a solvent is applied to selected portions of the ink layer, thereby eradicating the ink layer to form the pattern.

It has surprisingly been discovered that, in addition to improvements in quality and cost, fabrics produced according to the present invention using a pre-dried ink layer produce a significant improvement in resolution when compared to the prior art. It is believed that this improvement is primarily due to reduced diffusion of the ink into the PVC layer. The present invention can best be understood after a review of the following examples.

EXAMPLES 1-17

Comparisons were made between prior art selectively eradicable awning fabrics and fabrics produced according to the present invention. The prior art fabric first was prepared according to the process set forth in U.S. patent application Ser.. No. 08/594,984. Circles of various diameters were selectively eradicated from the fabric until the eradicated circle was no longer visually distinct from a distance of 12 feet. The procedure was then repeated using a fabric produced according to the present invention. Resolution was measured qualitatively on a scale of 1-5 with 5 being the most clearly defined and 3 being satisfactory.

TABLE 1

Resolution Trial Results

| Example | Fabric | Diameter (mm) | Resolution Value |
|---|---|---|---|
| 1 | prior art | 25 | 5 |
| 2 | prior art | 15 | 5 |
| 3 | prior art | 10 | 5 |
| 4 | prior art | 8 | 5 |
| 5 | prior art | 6 | 5 |
| 6 | prior art | 4 | 3 |
| 7 | prior art | 2 | 3 |
| 8 | prior art | 1 | 1 |
| 9 | prior art | 0.5 | 1 |
| 10 | present invention | 25 | 5 |
| 11 | present invention | 15 | 5 |
| 12 | present invention | 10 | 5 |
| 13 | present invention | 8 | 5 |
| 14 | present invention | 6 | 5 |
| 15 | present invention | 4 | 5 |
| 16 | present invention | 2 | 5 |
| 17 | present invention | 1 | 5 |
| 18 | present invention | 0.5 | 5 |

These results clearly show that the present invention provides an improved resolution when compared to the prior art. Specifically, there is about a four fold increase in resolution when compared to wet ink systems. Thus, the resulting eradicable ink layer has a resolution of between about 0.5 to 2 mm and, preferable, about 1 mm.

It should be understood that various changes and modifications to the presently preferred embodiments described herein will be apparent to those skilled in the art. For example, while the pre-dried ink layer is, preferably, formed on a release fabric and then dried, the layer of dried ink could be formed directly from powder using a transfer roll. Such changes and modifications can be made without departing from the spirit and scope of the present invention and without diminishing its attendant advantages. It is therefore intended that such changes and modifications be covered by the appended claims.

What is claimed is:

1. A method for producing a backlit sign and awning fabric having a selectively eradicable ink layer, comprising the steps of:

a) applying a selectively eradicable ink to a carrier substrate;

b) drying the inked carrier substrate;

c) applying a translucent plastisol coating on the dried ink carrier substrate;

d) applying a reinforcing scrim onto the translucent coating;

e) curing the product formed by steps a through d; and f) thereafter removing the carrier substrate.

2. The method according to claim 1, further including the step of calendaring and cooling the product after the curing step.

3. The method according to claim 1, wherein the curing is carried out in an oven having at least six different heating zones ranging in temperature from 200°–400° F.

4. The method according to claim 3, wherein the dwell time which said product remains in each of said heating zones ranges from 12–24 seconds.

5. The method according to claim 1, further including the step of selectively applying a solvent to the ink, thereby forming a selected pattern on the backlit sign and awning fabric.

6. The method of claim 1 wherein said carrier substrate is a cobalt complex treated release paper.

7. The method of claim 1 wherein said eradicable ink has a viscosity of about 3600 cps and an optical density of about 65–70% light transmission.

* * * * *

UNITED STATES PATENT AND TRADEMARK OFFICE
CERTIFICATE OF CORRECTION

PATENT NO. : 5,895,705
DATED : April 20, 1999
INVENTOR(S) : Earl T. Crouch and Keith N. Gray It is certified that error appears in the above-identified patent and that said Letters Patent is hereby corrected as shown below:

The title page should be deleted to appear as per attached title page.

Drawing sheets 1-3 should be deleted to appear as per attached sheets.

Signed and Sealed this

Fourteenth Day of March, 2000

Attest:

Attesting Officer

Q. TODD DICKINSON

Commissioner of Patents and Trademarks

US005895705A

United States Patent [19]
Crouch et al.

[11] Patent Number: 5,895,705
[45] Date of Patent: Apr. 20, 1999

[54] AWNING AND BACKLIT SIGN FABRIC HAVING A SELECTIVELY ERADICABLE INK LAYER AND A PROCESS FOR PRODUCING SAME

[75] Inventors: Earl T. Crouch, High Point; Keith N. Gray, Greensboro, both of N.C.

[73] Assignee: Highland Industries, Inc., Greensboro, N.C.

[21] Appl. No.: 08/891,555

[22] Filed: Jul. 11, 1997

[51] Int. Cl.⁶ .................................................. B32B 9/00
[52] U.S. Cl. .................. 156/247; 428/195; 428/200; 428/202; 428/204; 428/207; 428/211; 428/349; 428/352; 428/354; 428/913; 428/914; 362/152; 264/132; 264/259; 156/230; 156/239; 156/240; 156/249; 156/244.16; 156/277
[58] Field of Search ............................. 428/914, 913, 428/200, 207, 211, 349, 352, 354, 202, 204, 195; 362/152, 812; 156/240, 239, 249, 247, 309.6, 230, 244.16, 277; 264/132, 254

[56] References Cited

U.S. PATENT DOCUMENTS

| | | |
|---|---|---|
| 2,571,962 | 10/1951 | Smith et al. ................ 154/97.5 |
| 3,790,431 | 2/1974 | Tung ............................ 161/3.5 |
| 3,941,778 | 3/1976 | Mueller et al. ............... 260/240 B |
| 4,005,538 | 2/1977 | Tung ............................ 40/132 R |
| 4,104,468 | 8/1978 | Valenti ......................... 542/447 |
| 4,245,282 | 1/1981 | Sokol ........................... 362/84 |
| 4,462,852 | 7/1984 | Custor .......................... 156/231 |
| 4,513,107 | 4/1985 | Fabbrini et al. ............... 524/344 |
| 4,542,078 | 9/1985 | Fitzer et al. .................. 428/914 |
| 4,555,436 | 11/1985 | Geurtsen et al. .............. 428/200 |
| 4,565,842 | 1/1986 | Fitzer et al. .................. 524/57 |
| 4,692,847 | 9/1987 | Gandy .......................... 362/152 |
| 4,737,224 | 4/1988 | Fitzer et al. .................. 156/240 |
| 4,900,614 | 2/1990 | Miyazato et al. .............. 428/251 |
| 4,946,739 | 8/1990 | Chapman et al. .............. 428/286 |
| 5,021,931 | 6/1991 | Matsui et al. ................. 362/84 |
| 5,152,861 | 10/1992 | Hann ............................ 156/230 |
| 5,281,290 | 1/1994 | Bosler .......................... 156/230 |
| 5,490,893 | 2/1996 | Enlow et al. .................. 156/230 |

Primary Examiner—Bruce H. Hess
Assistant Examiner—Abraham Bahta
Attorney, Agent, or Firm—Rhodes, Coats & Bennett, LLP

[57] ABSTRACT

Backlit sign fabric formed by coating release paper with ink, applying a plastisol coating onto the dried ink, applying a reinforcing scrim onto the coating, curing the product, then removing the release paper.

7 Claims, 3 Drawing Sheets